(12) United States Patent
Bucher et al.

(10) Patent No.: US 12,712,446 B2
(45) Date of Patent: Aug. 18, 2026

(54) ADAPTIVE FILTER WITH Y CAPACITORS FOR A 3-PHASE DC ON-BOARD ELECTRICAL SYSTEM

(71) Applicant: VALEO EAUTOMOTIVE GERMANY GMBH, Erlangen (DE)

(72) Inventors: Alexander Bucher, Erlangen (DE); Maximilian Gerner, Erlangen (DE); Guido Rasek, Erlangen (DE); Mathias Baumann, Erlangen (DE); Dimitri Pundjak, Erlangen (DE); Michael Löbel, Erlangen (DE); Madhavi Dhara, Erlangen (DE); Rainer Edelhäuser, Erlangen (DE); Simon Schmidt, Erlangen (DE)

(73) Assignee: VALEO EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 19/101,802

(22) PCT Filed: Jul. 6, 2023

(86) PCT No.: PCT/EP2023/068792

§ 371 (c)(1),
(2) Date: Feb. 6, 2025

(87) PCT Pub. No.: WO2024/037780

PCT Pub. Date: Feb. 22, 2024

(65) Prior Publication Data

US 2026/0163479 A1 Jun. 11, 2026

(30) Foreign Application Priority Data

Aug. 15, 2022 (DE) .................... 10 2022 120 542.8

(51) Int. Cl.
*H02M 1/44* (2007.01)
*H02M 3/155* (2006.01)

(52) U.S. Cl.
CPC ............ *H02M 1/44* (2013.01); *H02M 3/155* (2013.01)

(58) Field of Classification Search
CPC ................................ H02M 1/44; H02M 3/155
See application file for complete search history.

(56) References Cited

FOREIGN PATENT DOCUMENTS

DE 10 2019 128 843 A1 6/2020

OTHER PUBLICATIONS

International Search Report & Written Opinion issued Sep. 29, 2023 in PCT/EP2023/068792, filed on Jul. 6, 2023, citing document 15 therein, 12 pages (with English translation).

*Primary Examiner* — Robert L Deberadinis
(74) *Attorney, Agent, or Firm* — Oblon, McClelland, Maier & Neustadt, L.L.P.

(57) ABSTRACT

Power converter having first, second and third lines, and a filter device having a first terminal connected to the first line, second terminal connected to the second line, and a third terminal connected to the third line. A first capacitor is provided via which a first current path is routed from the first terminal to the third terminal, a second capacitor via which a second current path is routed from the second terminal to the third terminal, a third capacitor connected between a center node, which is between the first capacitor and the second capacitor, and the third terminal. A switching device switches between a first filter mode, in which the first and second current paths are routed past the third capacitor to the third terminal, and a second filter mode, in which the first and second current paths are routed via the third capacitor to the third terminal.

20 Claims, 3 Drawing Sheets

100
101
105
106
1
20
1b
20
102
107
108
7
20
103
1a
104

ADAPTIVE FILTER WITH Y CAPACITORS FOR A 3-PHASE DC ON-BOARD ELECTRICAL SYSTEM

The present invention relates to a power converter for an on-board electrical system of an electrically driveable vehicle, having a first line for a first potential, a second line for a second potential, a third line for a reference potential and a filter device that has a first terminal that is connected to the first line, a second terminal that is connected to the second line, a third terminal that is connected to the third line, a first capacitor via which a first current path is routed from the first terminal to the third terminal, a second capacitor via which a second current path is routed from the second terminal to the third terminal, and a switching device that is configured to switch between a first filter mode and a second filter mode on the basis of control information.

In addition, the invention relates to an on-board electrical system for an electrically driveable vehicle.

DE 10 2017 220 982 A1 discloses a traction power supply system in an electric or hybrid vehicle. The traction power supply system comprises a high-voltage battery that is connected to a pulse-controlled inverter via a positive high-voltage line and a negative high-voltage line. A respective Y-capacitor is connected to the positive and the negative high-voltage line. The Y-capacitors are assigned a switching element that is able to be controlled by a control unit on the basis of at least one operating state.

DE 10 2021 003 180 A1 discloses an on-board electrical system for an electrically operable vehicle, having a first electrical potential line and a second electrical potential line, between which a DC voltage is applied to the on-board electrical system. The on-board electrical system has two first interference suppression capacitors that are electrically connected in series and are each electrically coupled to the potential lines by way of a terminal. The on-board electrical system also has a further interference suppression capacitor and a switch.

In electrically driveable vehicles, on-board electrical systems, in particular high-voltage on-board electrical systems, are typically designed as IT systems in which a first and second potential of a traction battery are isolated from a reference potential, in particular a vehicle housing potential. Power converters that are used in such on-board electrical systems and the first and second lines of which are able to be connected to the first and second potential of the traction battery may, during operation thereof, generate high-frequency interference signals that need to be filtered by way of a filter device for reasons of electromagnetic compatibility. Typically, such a filter device has two capacitors that are used in particular to dissipate a common-mode current on the first and the second line to a third line lying at the reference potential.

As the on-board electrical system voltage rises, which corresponds to the difference between the first potential and the second potential, the amount of energy stored in the first and second capacitors of the filter device also rises with the square of the on-board electrical system voltage. Relevant standards, such as for example ISO 6469-3, limit this amount of energy to a predefined value. As a result, in the case of an insulation fault, in particular during a charging process of the traction battery, electrical charges that are stored in the capacitors and flow away via the third line are able to be kept below a limit hazardous to the human body. Therefore, when designing power converters, an energy budget predefined by the design of the on-board electrical system has to be complied with.

It has indeed already been suggested to provide a switch in a current path between the capacitors and the third terminal in order to connect the capacitors to the third terminal of the filter device or the reference potential in a first filter mode and to disconnect them therefrom in a second filter mode. However, such switches have parasitic capacitances, the magnitude of which can be controlled only inaccurately due to production. In the second filter mode, this leads to a voltage division across the capacitors and the switch that can be predicted only with difficulty, which makes it much more difficult to precisely determine the energy budget for ensuring electrical safety and, possibly in conjunction with additional filter inductances, leads to a location of the filter frequencies that can be predicted very inaccurately.

The invention is based on the object of specifying an improved option for operating a power converter in an on-board electrical system of an electrically driveable vehicle.

This object is achieved according to the invention in a power converter of the type mentioned at the outset by virtue of the fact that the filter device further has a third capacitor that forms an electrically conductive connection between a center node, which is between the first capacitor and the second capacitor, and the third terminal, wherein the first current path and the second current path are routed past the third capacitor to the third terminal in the first filter mode and are routed via the third capacitor to the third terminal in the second filter mode.

The power converter according to the invention has a first line for a first potential, a second line for a second potential and a third line for a reference potential. The power converter further has a filter device. The filter device has a first terminal, a second terminal and a third terminal. The first terminal is connected to the first line. The second terminal is connected to the second line. The third terminal is connected to the third line. The filter device further has a first capacitor, a second capacitor and a third capacitor. A first current path is routed from the first terminal to the third terminal via the first capacitor. A second current path is routed from the second terminal to the third terminal via the second capacitor. The third capacitor forms an electrically conductive connection between a center node and the third terminal. The center node is between the first capacitor and the second capacitor. The filter device furthermore has a switching device. The switching device is configured to switch between a first filter mode and a second filter mode on the basis of control information. In the first filter mode, the first current path and the second current path are routed past the third capacitor to the third terminal. In the second filter mode, the first current path and the second current path are routed via the third capacitor to the third terminal.

In the power converter according to the invention, provision is made for the first and second current paths to be routed past the third capacitor in the first filter mode, such that the capacitances of the first capacitor and of the second capacitor can essentially act as Y-capacitances. This enables particularly efficient suppression of common-mode interference on the first and second lines. In the second filter mode, the first current path and the second current path are routed via the third capacitor. The third capacitor can thus advantageously provide a well-defined capacitance between the center node and the third terminal, which allows precise determination of an energy budget when designing the power converter. At the same time, the effective Y-capacitances of the filter device can be reduced in the second filter mode compared to the first filter mode.

With regard to electrical safety, the temporal progression of a body current in the event of an insulation fault can also be more precisely limited with an additional advantage, since, by specifying the capacitance of the third capacitor, the equivalent capacitance in the second filter mode and thus the discharge time constant resulting from the equivalent capacitance and the body resistance can be placed in a range with or without a low risk of fibrillation. Another advantage of the power converter according to the invention is that the capacitances of the first capacitor and of the second capacitor, due to the presence of the third capacitor in the second filter mode, additionally act partially as X-capacitances and thus enable stronger suppression of normal-mode interference.

The power converter according to the invention may be embodied as an inverter, as a DC/DC voltage converter or as an active rectifier. The power converter according to the invention may furthermore have a housing in which at least the first line, the second line, the third line and the filter device are accommodated. The third line may be electrically conductively connected to the housing. In this respect, the reference potential may also be regarded as a housing potential.

The first potential typically differs from the second potential. Preferably, the first potential is greater than the second potential. The reference potential preferably lies between the first potential and the second potential. The reference potential may also be regarded as ground potential. In one preferred configuration, the first line and the second line are each formed completely or at least in sections as solid busbars. The first and the second line may be connected to a DC voltage terminal of the power converter, at which in particular a connection device for putting the power converter in electrical contact with a DC voltage source is formed. The filter device is preferably arranged on the DC voltage terminal side.

The third line is not necessarily formed as a busbar. The third line may be formed by a cable, a ground plane or by a fastening means by way of which the filter device is fastened in the power converter, in particular on the housing.

The first capacitor, the second capacitor and the third capacitor may each have a first terminal and a second terminal between which the capacitance of the capacitor is provided. The first terminal of the first capacitor may be connected to the first terminal of the filter device. The second terminal of the second capacitor may be connected to the second terminal of the filter device.

The first capacitor, the second capacitor and the third capacitor may each be formed by a capacitor component or a plurality of interconnected capacitor components. The switching device is preferably a semiconductor switching device that in particular has one or more transistor structures. As an alternative, it is also possible for the switching device to be an electromechanical switching device that has for example one or more relays.

Preferably, in the first filter mode, an electrically conductive connection from the center node to the third terminal completely passes the third capacitor. However, it is also possible for a further current path to be routed along the third capacitor in the first filter mode. The further current path preferably has a higher impedance than the sections of the first and second current paths passing the third capacitor.

Preferably, the filter device of the power converter according to the invention is configured, in the second filter mode, to set in each case a higher pole frequency for filtering a common-mode current on the first line and the second line along the first current path and the second current path than in the first filter mode. In the case of a first insulation fault, the discharge time constant, which results from the effective Y-capacitance and a body resistance, can be thereby advantageously modified.

In one preferred configuration of the power converter according to the invention, the center node is a common node of a terminal of the third capacitor facing away from the third terminal, a terminal of the first capacitor facing away from the first terminal and/or facing the second capacitor and a terminal of the second capacitor facing away from the second terminal and/or facing the first capacitor. The terminal of the third capacitor facing away from the third terminal may correspond to the second terminal of the third capacitor. The terminal of the first capacitor facing away from the first terminal of the filter device and/or facing the second capacitor may correspond to the second terminal of the first capacitor. The terminal of the second capacitor facing away from the second terminal of the filter device and/or facing the first capacitor may correspond to the first terminal of the second capacitor.

Preferably, provision is made for a terminal of the third capacitor facing away from the center node to be connected to the third terminal. The terminal of the third capacitor facing away from the center node may correspond to the first terminal of the third capacitor.

With regard to the switching device of the power converter according to the invention, it is preferred if the switching device has a first terminal and a second terminal and a switching path that can be controlled on the basis of the control information.

The first terminal of the switching device may be connected to the center node and/or to the third capacitor, in particular to its second terminal. Preferably, the first terminal of the switching device, the center node and the second terminal of the third capacitor form a common circuit node. The second terminal of the switching device may be connected to the third terminal of the filter device and/or to the third capacitor, in particular to its first terminal. Preferably, the second terminal of the switching device, the third terminal of the filter device and the first terminal of the third capacitor form a common circuit node.

In a preferred development, provision is also made for the switching device to be configured to switch on the switching path so as to adopt the first filter mode and/or to switch it off so as to adopt the second filter mode.

In general, it is advantageous in the case of the power converter according to the invention if the switching device is connected in parallel with the third capacitor. The first current path and the second current path can then be routed past the third capacitor via the switching device in the first filter mode.

In order to filter common-mode currents particularly efficiently in the first filter mode, the switching device may be designed as a bidirectionally conductive and/or blocking switch.

With regard to the dimensioning of the capacitors, the following may be provided: The capacitance of the third capacitor may be less than the capacitance of the first capacitor. The capacitance of the third capacitor may be less than the capacitance of the second capacitor.

The capacitances of the first capacitor and of the second capacitor may be the same. This enables a particularly symmetrical voltage distribution across the first and second capacitor.

In order to also enable efficient suppression of normal-mode interference in the first filter mode, the filter device may furthermore have a fourth capacitor that is connected to the first terminal of the filter device and to the second terminal of the filter device in parallel with the first capacitor and with the second capacitor. In other words, the fourth capacitor may provide a fixed X-capacitance.

In one preferred configuration of the power converter according to the invention, the filter device has a printed circuit board. The first to third capacitors may be arranged on the printed circuit board. The fourth capacitor may also be arranged on the printed circuit board. The first to third terminals of the filter device may be arranged on the printed circuit board. The switching device may be arranged on the printed circuit board.

The power converter according to the invention may furthermore have a DC link capacitor connected between the first line and the second line.

The power converter according to the invention may furthermore have a converter circuit connected between the first line and the second line. The converter circuit may have power semiconductor switches, which are interconnected in particular as a switching cell, power bridge or as a B6 bridge circuit, in order to convert the voltage present between the first line and the second line in a switching mode. The filter device is preferably arranged on that side of the DC link capacitor facing away from the converter circuit.

The power converter according to the invention may furthermore have inductive filter elements that act as longitudinal inductances in the first line and the second line and are arranged on the DC link capacitor side and/or DC voltage input side, in particular in physical proximity, on the filter device. The filter elements may be formed around the lines by ferrite cores, for example nanocrystalline cores, iron powder cores or other cores made of magnetic material.

Parasitic inductances along the first line and the second lines between the DC voltage terminal, on the one hand, and the first terminal and the second terminal of the filter device or the filter elements on the DC voltage terminal side, on the other hand, are preferably lower than parasitic inductances between the first terminal and the second terminal of the filter device or the filter elements on the DC link capacitor side, on the one hand, and the DC link capacitor, on the other hand.

The object on which the invention is based is furthermore achieved by an on-board electrical system for an electrically driveable vehicle, having at least one power converter as described above, a traction battery, a charging device that is able to be connected to an electrical power supply system external to the vehicle in order to charge or discharge the traction battery, and a control device that is configured to provide the control information to adopt the second filter mode when and/or for as long as the charging device is connected to the electrical power supply system external to the vehicle.

It is thus advantageously possible to predefine the first filter mode in a driving mode of the vehicle or of the on-board electrical system and the second filter mode in a charging mode.

The traction battery preferably has a nominal voltage of at least 400 volts, preferably at least 600 volts, particularly preferably at least 800 volts.

A power converter of the on-board electrical system may be designed as an inverter that is configured to electrically supply a polyphase AC voltage to an electric machine, in particular a permanently or electrically excited synchronous machine, an axial flux motor or an asynchronous machine, in order to drive the vehicle.

A power converter of the on-board electrical system may form part of the charging device and may be configured to convert a DC or AC voltage provided by the electrical power supply system external to the vehicle into a DC voltage for charging the traction battery.

A power converter of the on-board electrical system may be designed as a DC/DC voltage converter that is configured to couple the on-board electrical system to a further on-board electrical system, in particular a low-voltage on-board electrical system, of the vehicle. A potential of the low-voltage on-board electrical system may correspond to the reference potential.

The on-board electrical system may furthermore have an electrical line, for example an electrically conductive fastening or a ground strip, by way of which the third line of the at least one power converter is electrically conductively connected to a vehicle body of the vehicle.

Further advantages and details of the present invention can be found in the exemplary embodiments described below and on the basis of the drawings. These drawings are schematic illustrations, in which:

FIG. 1 is a circuit diagram of one exemplary embodiment of a power converter 1.

Figure 1:
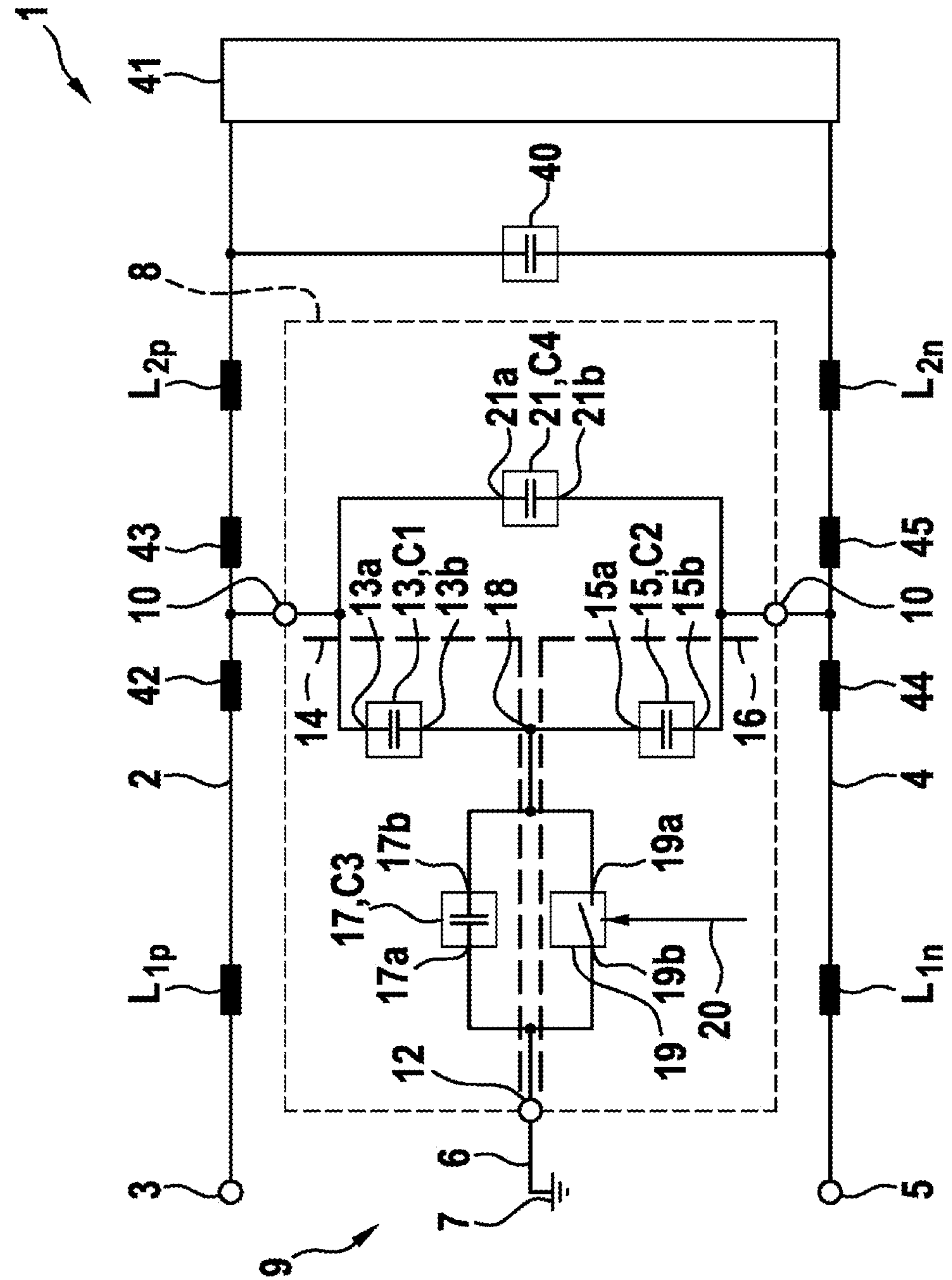
FIG. 1 shows a circuit diagram of one exemplary embodiment of the power converter according to the invention.

The power converter 1 has a first line 2 for a first potential 3, a second line 4 for a second potential 5, and a third line 6 for a reference potential 7, which may also be considered as ground potential. By way of example, the first potential 3 is higher than the second potential 5 and the power converter 1 is configured to be operated with a potential difference of 800 volts between the first potential 3 and the second potential 5. The reference potential 7 lies, by way of example, between the first potential 3 and the second potential 5.

The power converter 1 also has a filter device 8. Specifically, the filter device 8 serves as an interference suppression filter, that is to say to improve the electromagnetic compatibility of the power converter 1, and is preferably arranged close to a DC voltage terminal 9.

The filter device 8 has a first terminal 10 that is connected to the first line 2, a second terminal 11 that is connected to the second line 4, and a third terminal 12 that is connected to the third line 6. In addition, the filter device has a first capacitor 13 via which a first current path 14 is routed from the first terminal 10 to the third terminal 12, and a second capacitor 15 via which a second current path 16 is routed from the second terminal 11 to the third terminal 12. The current paths 14, 16 are illustrated purely schematically by dashed lines in FIG. 1. In addition, the filter device has a third capacitor 17 which forms an electrically conductive connection between a center node 18, which is between the first capacitor 13 and the second capacitor 15, and the third terminal 12.

In addition, the filter device 8 has a switching device 19. The switching device 19 is configured to switch between a first filter mode and a second filter mode on the basis of control information 20. In the first filter mode, the first current path 14 and the second current path 16 are routed past the third capacitor 17 to the third terminal 12. In the second filter mode, the first current path 14 and the second current path 16 are routed via the third capacitor 17 to the third terminal 12.

The capacitances $C_1$, $C_2$ of the first capacitor 13 and of the second capacitor 15 can act in the first filter mode as Y-capacitances for filtering common-mode interference on the first and second line 2, 4. In the second filter mode, the capacitances $C_1$, $C_2$ form, together with the capacitance Cs of the third capacitor 17, a capacitor network that provides, in particular, a well-defined capacitance between the center node 18 and the third terminal 12 and additionally provides an X-capacitance for filtering normal-mode interference on the first line 2 and the second line 4. The filter device 8 is configured, in the second filter mode, to set in each case a higher pole frequency for filtering a common-mode current on the first line 2 and the second line 4 along the first current path 14 and the second current path 16 than in the first filter mode.

The first capacitor 13 has a first terminal 13*a* and a second terminal 13*b*. The second capacitor 15 has a first terminal 15*a* and a second terminal 15*b*. The third capacitor has a first terminal 17*a* and a second terminal 17*b*. The switching device has a first terminal 19*a* and a second terminal 19*b*, between which a switching path able to be controlled on the basis of the control information 20 is formed.

In the present exemplary embodiment, the filter device 8 is implemented in terms of circuitry in particular by virtue of the fact that the switching device 19 is connected in parallel with the third capacitor 17 and is configured to switch on the switching path so as to adopt the first filter mode and to switch it off so as to adopt the second filter mode. In detail, the first terminal 19*a* of the switching device 19 is connected to the second terminal 17*b* of the third capacitor 17 and the second terminal 19*b* of the switching device 19 is connected to the first terminal 17*a* of the third capacitor 17.

In addition, the first terminal 17*a* of the third capacitor 17 facing away from the center node 18 is connected to the third terminal 12 of the filter device 8. The second terminal 17*b* of the third capacitor 17 is connected to the center node 18. In particular, the third terminal 12 of the filter device 8, the first terminal 17*a* of the third capacitor 17 and the second terminal 19*b* of the switching device 19 form a common circuit node of the filter device 8. Accordingly, the center node 18, the second terminal 17*b* of the third capacitor 17 and the first terminal 19*a* of the switching device 19 form a common circuit node of the filter device 8.

In the present exemplary embodiment, the first terminal 13*a* of the first capacitor 13 is connected to the first terminal 10 of the filter device 8. The second terminal 15*b* of the second capacitor 15 is connected to the second terminal 11 of the filter device 8. The center node 18 furthermore forms a common node of the second terminal 13*b* of the first capacitor 13, the first terminal 15*a* of the second capacitor 15, and the second terminal 17*b* of the third capacitor 17.

If, in the present exemplary embodiment, the switching device 19 adopts the second filter mode by opening the switching path, the result is the following equivalent capacitance $C_{eq}$ for filtering of common-mode interference:

$$C_{eq} = \frac{C_3(C_1 + C_2)}{C_3 + (C_1 + C_2)}$$

Assuming that $C_1=C_2=C_0$ are the same, it follows that:

$$C_{eq} = \frac{2C_0C_3}{C_3 + 2C_0}$$

If $C_3$ is now expressed as a ratio to $C_0$ by $C_3=k\cdot C_0$, it follows that:

$$C_{eq} = \frac{2kC_0^2}{(k+2)C_0} \Rightarrow \frac{C_{eq}}{2C_0} = \frac{1}{1+\frac{2}{k}}$$

By selecting k<1, the equivalent capacitance for filtering common-mode interference in the second filter mode can therefore be significantly reduced, which accordingly reduces the amount of energy to be taken into account for determining an energy budget.

According to the present exemplary embodiment, a fourth capacitor 21 having a first terminal 21*a* and a second terminal 21*b* of the filter device 8 is optionally provided. The fourth capacitor 21 is connected to the first terminal 10 of the filter device 8 and to the second terminal 11 of the filter device 8 in parallel with the first capacitor 13 and with the second capacitor 15. In this case, the first terminal 10 of the filter device 8, the first terminal 13*a* of the first capacitor 13 and the first terminal 21*a* of the fourth capacitor 21 form a common circuit node. Furthermore, the second terminal 11 of the filter device 8, the second terminal 15*b* of the second capacitor and the second terminal 21*b* of the fourth capacitor 21 form a common circuit node. The fourth capacitor 21 provides a fixed X-capacitance.

FIG. 1 furthermore shows a DC link capacitor 40 that is connected between the first line 2 and the second line 4, and a converter circuit 41 that is connected between the first line 2 and the second line 4. It may be seen that the filter device 8 is arranged on that side of the DC link capacitor 40 facing away from the converter circuit 41.

The power converter 1 furthermore has four inductive filter elements 42, 43, 44, 45 which act as longitudinal inductances in the lines 2, 4 and are formed around the lines 2, 4, for example by ferrite cores. The filter elements 42 to 45 are arranged close to the filter device 8. The filter elements 42, 44 are arranged on the DC voltage input side with respect to the filter device 8. The filter elements 43, 45 are arranged on the DC link capacitor side with respect to the filter device 8.

FIG. 1 furthermore schematically illustrates parasitic inductances Lip, Lin along the first line 2 and the second line 4, respectively, between the DC voltage terminal 9 and the filter device 8 and the filter elements 42, 44, respectively, and parasitic inductances $L_{2p}$, $L_{2n}$ along the first line 2 and the second line 4, respectively, between the filter device 8 and the filter elements 43, 45, respectively, and the DC link capacitor 40. In this case, the arrangement of the filter device 8 may be selected such that $L_{1p}$ and $L_{1n}$ are less than $L_{2p}$ and $L_{2n}$, in order to enable filtering that is as efficient as possible.

Figure 2:
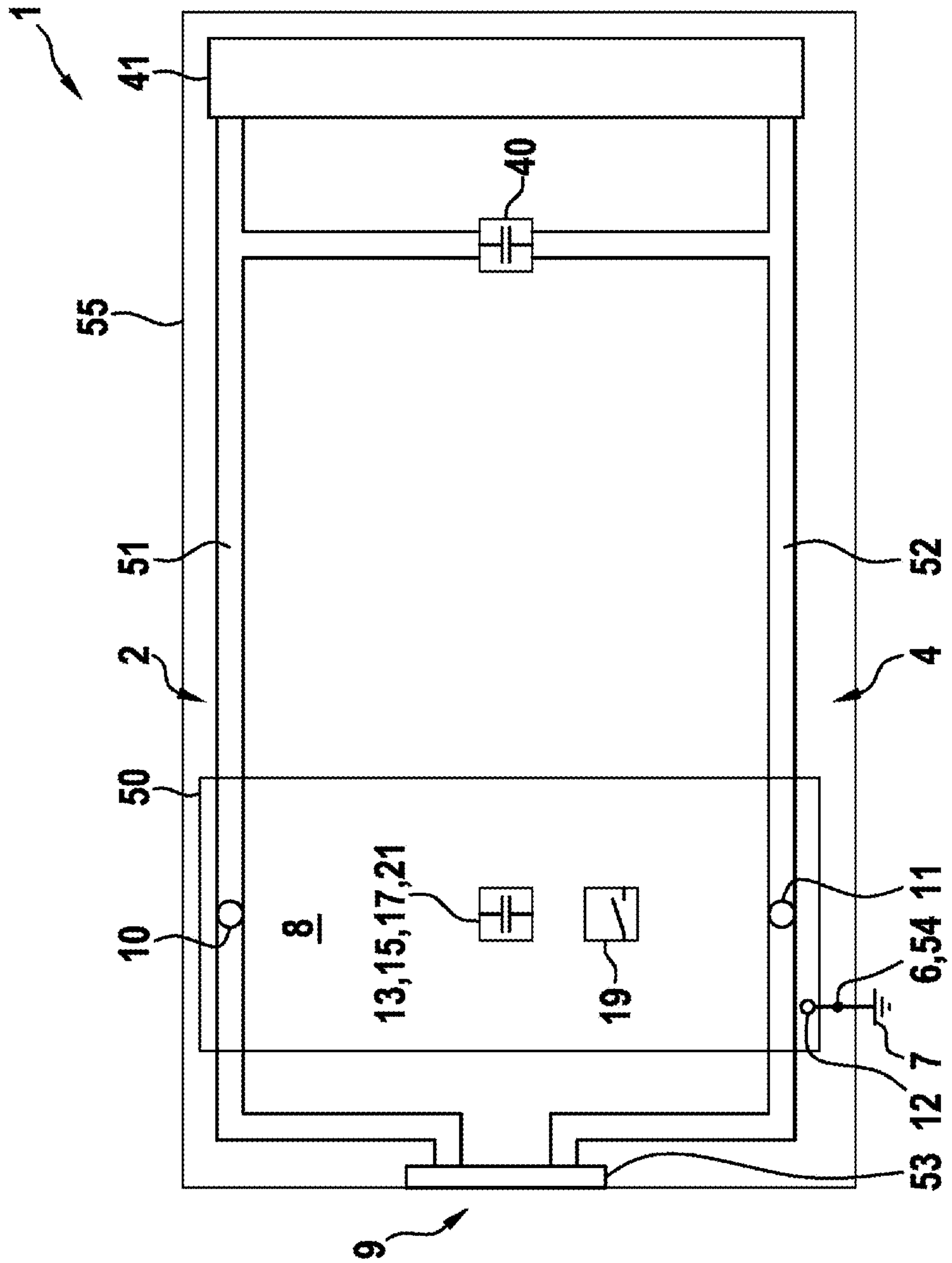
FIG. 2 shows a schematic diagram of the power converter according to the exemplary embodiment.

FIG. 2 is a schematic diagram of the power converter 1 according to the exemplary embodiment.

The filter device 8 has a printed circuit board 50 on which the terminals 10, 11, 12, the capacitors 13, 15, 17, 21 and the switching device 19 are arranged. The first line 2 and the second line 4 are each formed by solid busbars 51, 52 that are in contact with the terminals 10, 11 on the printed circuit board 50. The DC voltage terminal 9, formed as a connection device 53, is connected to a first end of the busbars 51, 52. The converter circuit 41 is connected to a second end of the busbars 51, 52. The DC link capacitor 40 is likewise in contact with the busbars 51, 52 and may be located, in relation to the length of the busbars 51, closer to the converter circuit 41 than to the filter device 8.

The third terminal 12 of the filter device 8 is not in contact with the busbars 51, 52, but rather is connected to a housing 55 of the power converter 1 by way of a fastening means 54 that forms the third line 6. The reference potential 7 may therefore also be regarded as a housing potential. The lines 2, 4 or the busbars 51, 52, the filter device 8, the DC link capacitor 40 and the converter circuit 41 are housed in the housing 55.

The power converter 1 may be designed as an inverter, a DC/DC voltage converter or as an active rectifier. The converter circuit 41 has semiconductor switching elements suitable for this purpose.

Figure 3:
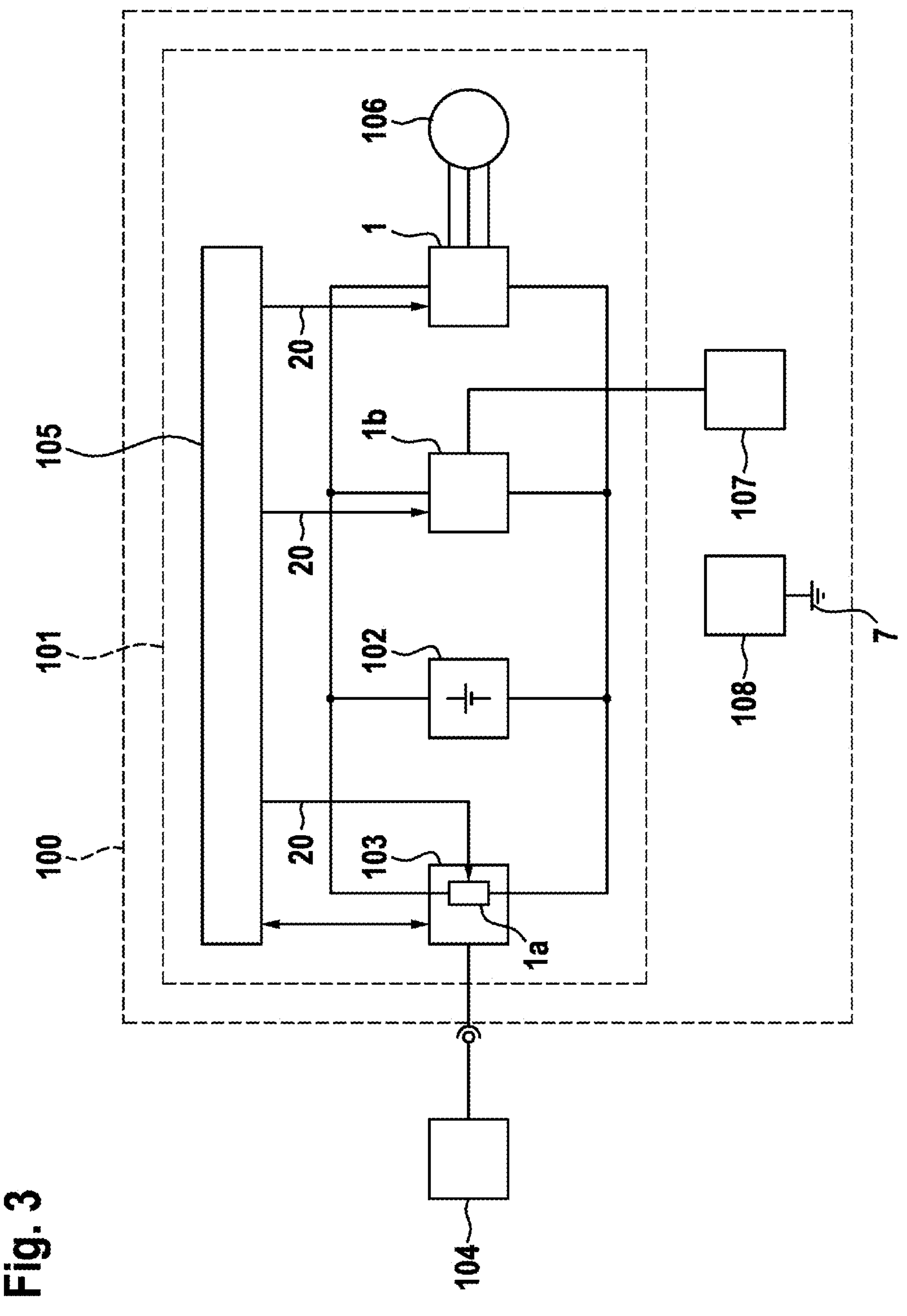
FIG. 3 shows a block diagram of one exemplary embodiment of the on-board electrical system according to the invention in a vehicle.

FIG. 3 is a block diagram of one exemplary embodiment of an on-board electrical system 101 in a vehicle 100.

The on-board electrical system 101 has a traction battery 102 having a nominal voltage of for example 800 volts, a charging device 103 that is able to be connected to an electrical power supply system 104 external to the vehicle in order to charge or discharge the traction battery 102, and a control device 105 that is configured to provide the control information 20. The on-board electrical system 101 may be considered to be a high-voltage on-board electrical system, since its operating voltage is generally above 60 V.

The on-board electrical system 101 has a power converter 1 according to the exemplary embodiment described above, designed as an inverter. The power converter 1 is configured to supply electric power to an electric machine 106 of the onboard electrical system 101 by way of a polyphase AC voltage in order to drive the vehicle 100. The electric machine 106 is for example a permanently or electrically excited synchronous machine, an axial flux machine or an asynchronous machine.

The on-board electrical system 101 has a further power converter 1*a* according to the exemplary embodiment described above, which is designed as an active rectifier or as a DC/DC voltage converter and forms part of the charging device 103. The power converter 1*a* is configured to convert a DC or AC voltage provided by the electrical power supply system 104 external to the vehicle into a DC voltage for charging the traction battery 102.

The on-board electrical system 101 has a further power converter 1*b* according to the exemplary embodiment described above, designed as a DC/DC voltage converter. The power converter 1*b* is configured to couple the on-board electrical system 101 to a further on-board electrical system 107 of the vehicle 100. The further on-board electrical system 107 is for example a low-voltage on-board electrical system having an operating voltage of less than 60 volts, for example 12 volts, 24 volts or 48 volts.

The control device 105 communicates with the charging device 103 via a signal line, symbolized by a double-headed arrow. The control device 105 is configured to provide the power converters 1, 1*a*, 1*b* with the control information 20 to adopt the second filter mode when and for as long as the charging device 103 is connected to the electrical power supply system 104 external to the vehicle. The second filter mode may thus be regarded in particular as a charging mode. By contrast, the control information 20 is provided in particular to adopt the first filter mode when the charging device 103 is disconnected from the electrical power supply system 104 external to the vehicle and when the vehicle 100 is driving. The first filter mode may therefore also be regarded as a driving mode.

The on-board electrical system 101 may furthermore have electrical conductors by way of which the third line 6 (see FIG. 1) of a respective power converter 1, 1*a*, 1*b* is electrically conductively connected to a vehicle body 108 of the vehicle 101, such that the reference potential 7 may also be regarded as a vehicle body potential. This is, at the same time, one of the potentials of the further on-board electrical system 107.

The vehicle 100 may accordingly be designed as a battery electric vehicle (BEV) or as a hybrid vehicle.

The invention claimed is:

1. A power converter for an on-board electrical system of an electrically driveable vehicle, having a first line for a first potential, a second line for a second potential, a third line for a reference potential and a filter device that has a first terminal that is connected to the first line, a second terminal that is connected to the second line, a third terminal that is connected to the third line, a first capacitor via which a first current path is routed from the first terminal to the third terminal, a second capacitor via which a second current path is routed from the second terminal to the third terminal, and a switching device that is configured to switch between a first filter mode and a second filter mode on the basis of control information, wherein the filter device further has a third capacitor that forms an electrically conductive connection between a center node, which is between the first capacitor and the second capacitor, and the third terminal, wherein the first current path and the second current path are routed past the third capacitor to the third terminal in the first filter mode and are routed via the third capacitor to the third terminal in the second filter mode.

2. The power converter as claimed in claim 1, wherein the filter device is configured, in the second filter mode, to set in each case a higher pole frequency for filtering a common-mode current on the first line and the second line along the first current path and the second current path than in the first filter mode.

3. The power converter as claimed in claim 2, wherein the center node is a common node of a terminal of the third capacitor facing away from the third terminal, a terminal of the first capacitor facing away from the first terminal and/or facing the second capacitor, and a terminal of the second capacitor facing away from the second terminal and/or facing the first capacitor.

4. The power converter as claimed in claim 2, wherein a terminal of the third capacitor facing away from the center node is connected to the third terminal.

5. The power converter as claimed in claim 2, wherein the switching device has a first terminal and a second terminal and a switching path able to be controlled on the basis of the control information.

6. The power converter as claimed in claim 1, wherein the center node is a common node of a terminal of the third capacitor facing away from the third terminal, a terminal of the first capacitor facing away from the first terminal and/or facing the second capacitor, and a terminal of the second capacitor facing away from the second terminal and/or facing the first capacitor.

7. The power converter as claimed in claim 1, wherein a terminal of the third capacitor facing away from the center node is connected to the third terminal.

8. The power converter as claimed in claim 1, wherein the switching device has a first terminal and a second terminal and a switching path able to be controlled on the basis of the control information.

9. The power converter as claimed in claim 8, wherein the first terminal of the switching device is connected to the center node and/or to the third capacitor.

10. The power converter as claimed in claim 9, wherein the second terminal of the switching device is connected to the third terminal of the filter device and/or to the third capacitor.

11. The power converter as claimed in claim 9, wherein the switching device is configured to switch on the switching path so as to adopt the first filter mode and/or to switch it off so as to adopt the second filter mode.

12. The power converter as claimed in claim 8, wherein the second terminal of the switching device is connected to the third terminal of the filter device and/or to the third capacitor.

13. The power converter as claimed in claim 8, wherein the switching device is configured to switch on the switching path so as to adopt the first filter mode and/or to switch it off so as to adopt the second filter mode.

14. The power converter as claimed in claim 1, wherein the switching device is connected in parallel with the third capacitor.

15. The power converter as claimed in claim 1, wherein the switching device is designed as a bidirectionally conductive and/or blocking switch.

16. The power converter as claimed in claim 1, wherein the capacitance of the third capacitor is less than the capacitance of the first capacitor and/or of the second capacitor, and/or the capacitances of the first capacitor and of the second capacitor are the same.

17. The power converter as claimed in claim 1, wherein the filter device further has a fourth capacitor that is connected to the first terminal of the filter device and to the second terminal of the filter device in parallel with the first capacitor and with the second capacitor.

18. The power converter as claimed in claim 1, wherein the filter device has a printed circuit board, wherein the first to third capacitors, in particular also a fourth capacitor, are arranged on the printed circuit board and/or the first to third terminals of the filter device are arranged on the printed circuit board and/or the switching device is arranged on the printed circuit board.

19. The power converter as claimed in claim 1, further comprising a DC link capacitor, which is connected between the first line and the second line, and a converter circuit, which is connected between the first line and the second line, wherein the filter device is arranged on a side of the DC link capacitor facing away from the converter circuit.

20. An onboard electrical system for an electrically driveable vehicle, having at least one power converter as claimed in claim 1, a traction battery, a charging device that is able to be connected to an electrical power supply system external to the vehicle in order to charge or discharge the traction battery, and a control device that is configured to provide the control information to adopt the second filter mode when and/or for as long as the charging device is connected to the electrical power supply system external to the vehicle.

* * * * *